United States Patent
Ambroziak

(10) Patent No.: US 6,823,492 B1
(45) Date of Patent: Nov. 23, 2004

(54) METHOD AND APPARATUS FOR CREATING AN INDEX FOR A STRUCTURED DOCUMENT BASED ON A STYLESHEET

(75) Inventor: Jacek R. Ambroziak, Acton, MA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

(21) Appl. No.: 09/513,439

(22) Filed: Feb. 25, 2000

Related U.S. Application Data
(60) Provisional application No. 60/174,967, filed on Jan. 6, 2000.

(51) Int. Cl.[7] .......................... G06F 15/00; G06F 17/00; G06F 17/21; G06F 17/24
(52) U.S. Cl. ..................... 715/530; 715/513; 715/501.1
(58) Field of Search ................................ 715/513, 530, 715/531, 501.1; 707/100; 713/1; 379/88.17

(56) References Cited

U.S. PATENT DOCUMENTS

| | | | | |
|---|---|---|---|---|
| 5,471,677 A | * | 11/1995 | Imanaka ........................ | 707/5 |
| 5,710,978 A | * | 1/1998 | Swift ...................... | 455/67.11 |
| 5,819,273 A | * | 10/1998 | Vora et al. .................... | 707/10 |
| 5,899,975 A | * | 5/1999 | Nielsen ................... | 704/270.1 |
| 5,931,940 A | * | 8/1999 | Shelton et al. .............. | 712/204 |
| 5,983,248 A | * | 11/1999 | DeRose et al. ............. | 715/513 |
| 6,067,543 A | * | 5/2000 | Burrows ........................ | 707/4 |
| 6,067,618 A | * | 5/2000 | Weber ............................ | 713/1 |
| 6,076,051 A | * | 6/2000 | Messerly et al. .............. | 704/9 |
| 6,119,120 A | * | 9/2000 | Miller ........................ | 707/101 |
| 6,154,738 A | * | 11/2000 | Call ............... | 707/4 |
| 6,263,332 B1 | * | 7/2001 | Nasr et al. ..................... | 707/5 |
| 6,336,117 B1 | * | 1/2002 | Massarani .................... | 707/100 |
| 6,587,547 B1 | * | 7/2003 | Zirngibl et al. .......... | 379/88.17 |
| 6,591,271 B1 | * | 7/2003 | Ceri et al. .................. | 707/102 |
| 6,675,354 B1 | * | 1/2004 | Claussen et al. ............ | 715/513 |

FOREIGN PATENT DOCUMENTS

EP           0 964 344 A2      12/1999

OTHER PUBLICATIONS

Publication, entitled "XSLT in document indexing," by Jacek Ambroziak, XP–002165125, pp. 1–14.
Publication, entitled "Managing tokenizers in XML search," by Jacek Ambroziak, XP–002165124, pp. 1–6.
Publication, entitled "XML tools and architecture for Named Entity Recognition," by Andrei Mikheev, et al., XP–000863186, 1999, pp. 89–113.
Publication, entitled "Conceptually Assisted Web Browsing," by Jacek Ambroziak, XP–002165122, pp. 1–7.
Publication, entitled "Acoi: A System for Indexing Multimedia Objects," by Menzo Windhouwer, et al., XP–002165123, pp. 1–10.

* cited by examiner

Primary Examiner—Stephen S. Hong
Assistant Examiner—Jonathan Schlaifer
(74) Attorney, Agent, or Firm—Park, Vaughan & Fleming, LLP

(57) ABSTRACT

One embodiment of the present invention provides a system that generates an index to facilitate searching through text within a document based upon an index stylesheet associated with the document. The system operates by receiving a document to be indexed and then parses the document to produce a parsed document. The system also retrieves instructions for creating the index for the document from an index stylesheet associated with the document. The system creates the index for the document by transforming the parsed document in a manner that is specified by the instructions retrieved from the index stylesheet. In one embodiment of the present invention, retrieving the index stylesheet involves retrieving the index stylesheet across a network from a remote address.

27 Claims, 4 Drawing Sheets

METHOD AND APPARATUS FOR CREATING AN INDEX FOR A STRUCTURED DOCUMENT BASED ON A STYLESHEET

RELATED APPLICATIONS

The application hereby claims priority under 35 U.S.C. § 119 to Provisional Patent Application No. 60/174,967 filed on Jan. 6, 2000. The subject matter of this application is related to the subject matter in a co-pending non-provisional application by the same inventor as the instant application and filed on the same day as the instant application entitled, "Method and Apparatus for Flexibly Assigning Tokenization Procedures," having serial number TO BE ASSIGNED, and filing date TO BE ASSIGNED.

BACKGROUND

The present invention relates to indexing structures to facilitate computerized searches through data. More specifically, the present invention relates to a method and an apparatus for generating an index to facilitate searching through data within a document based upon a predefined index stylesheet associated with the document that contains instructions for creating an index for the document.

The explosive growth of the Internet has been strongly tied to the development of search engines that allow users to rapidly search through large volumes of textual data from thousands and even millions of different web sites. A user who is interested in a particular topic merely has to enter a number of keywords into a search engine in order to receive linkages to different web pages containing the key words.

Search engines typically create an "index" of documents (such as web pages) that are available on the world wide web. An index typically stores individual words (or other meaning carrying textual strings) in a more compact and easily searchable form known as "tokens."

The process of building an effective index can be greatly complicated by the fact that documents can exist a wide variety of different forms which need to be indexed differently. For example, an efficient index for a technical paper might contain the abstract and tide of the technical paper, but not the body of the technical paper, whereas an efficient index for a television schedule might contain ratings for individual television programs.

The process of creating an index is also complicated by the fact that for common document formats, such the Hypertext Markup Language (HTML) or the Extensible Markup Language (XML), much of the important information for search purposes is stored within attribute fields, and is not within the normal text of the document.

Furthermore, the structure of a document may change over time, which can require the structure of the index to change. For example, suppose the structure of a product catalog is updated to include consumer reviews for individual products. This change may require the index to change to include these consumer reviews.

Existing systems create indexes for documents using ad hoc rules. For example, one ad hoc rule is to create an index for all textual information that is not within attribute fields. Unfortunately, such ad hoc rules often include much unimportant information in the index, and often exclude important information.

A similar problem exists in converting the document into tokens (tokenizing the document) during the index creation process. During the index creation process, relevant portions of a document are converted into tokens associated with individual meaning-carrying units of text, such as wordforms or numbers. In the English language, wordforms are typically delineated by white spaces and punctuation marks. Hence, the tokenizing process is relatively easy. In contrast, languages such as Japanese have no such delineation. Consequently, the tokenization process depends on contextual information and can be very complicated.

The tokenization process can also be domain dependent. For example, periods within an email address, such as "person.dept@companyx.com" are linking elements, whereas periods within other textual information typically delineate word and sentence boundaries.

Hence, the tokenization process varies between languages and between domains.

SUMMARY

One embodiment of the present invention provides a system that generates an index to facilitate searching through text within a document based upon an index stylesheet associated with the document. The system operates by receiving a document to be indexed and then parses the document to produce a parsed document. The system also retrieves instructions for creating the index for the document from an index stylesheet associated with the document. The system creates the index for the document by transforming the parsed document in a manner that is specified by the instructions retrieved from the index stylesheet.

In one embodiment of the present invention, retrieving the index stylesheet involves retrieving the index stylesheet across a network from a remote address.

In one embodiment of the present invention, the index stylesheet is appended to the document.

In one embodiment of the present invention, the system additionally makes the index available to a search engine so that the search engine is able to scan through the index.

In one embodiment of the present invention, the index stylesheet specifies sections of the document to skip in creating the index for the document.

In one embodiment of the present invention, the index stylesheet specifies attributes of the document that are to be included in the index.

In one embodiment of the present invention, the system receives additional documents to be indexed, and creates indexes for the additional documents using the index stylesheet.

In one embodiment of the present invention, creating the index for the document involves tokenizing the document by partitioning text within the document into individual meaning-carrying units of text.

In one embodiment of the present invention, prior to receiving the document, the system downloads and parses an index configuration file which specifies the index stylesheet to be used in creating the index.

In one embodiment of the present invention, the system receives the document from a client at an indexing server that creates the index for the client.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Distributed Computing System

Figure 1:
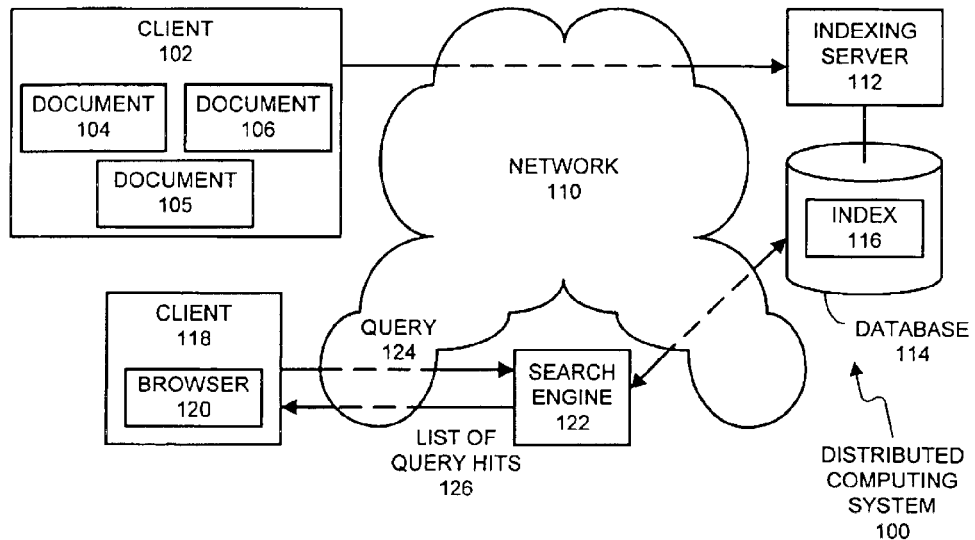
FIG. 1 illustrates a distributed computing system in accordance with an embodiment of the present invention.

FIG. 1 illustrates a distributed computing system 100 in accordance with an embodiment of the present invention. Distributed computing system 100 includes clients 102 and 118, which are coupled to indexing server 112 and search engine 122 through network 110.

Network 110 can include any type of wire or wireless communication channel capable of coupling together computing nodes. This includes, but is not limited to, a local area network, a wide area network, or a combination of networks. In one embodiment of the present invention, network 110 includes the Internet.

Clients 102 and 118 can include any node on network 110 including computational capability and including a mechanism for communicating across network 110.

Client 102 contains a number of documents 104–106, which are to be integrated into index 116 within indexing server 112. Indexing server 112 can include any node on a computer network including a mechanism for servicing requests from a client for computational and/or data storage resources. More specifically indexing server 112 includes resources for creating index 116 within database 114 for indexing documents 104–106. Database 114 can include any type of mechanism for storing data in non-volatile form. In one embodiment of the present invention, database 114 includes the ORACLE 8™ database distributed by the Oracle Corporation of Redwood Shores, Calif.

Client 118 includes a browser 120 that communicates with search engine 122 in order to scan through index 116. Browser 120 can include any type of web browser capable of viewing a web site, such the INTERNET EXPLORERS browser distributed by the Microsoft Corporation of Redmond, Wash. Search engine 122 can include any type of computing system or application that is able to search through data.

During operation, indexing server 112 retrieves documents 104–106 from client 102, and uses documents 104–106 to create index 116. Note that client 102 may send documents 104–106 to indexing server 112. Or, alternatively, indexing server 112 can gather documents 104–106 from client 102.

Indexing server 112 creates index 116 by tokenizing selected portions of documents 104–106 and by creating index 116 from the tokens. Note that client 102 may itself be a server that makes documents 104–106 available over network 110.

After index 116 is created, client 118 submits a query 124 to search engine 122 through browser 120. Query 124 may specify keywords of interest to a user of client 118. In response to query 124, search engine 122 searches through index 116 to find documents containing matching keywords within index 116. If such documents are located, search engine 122 returns the documents in a list of query hits 126 to browser 120.

Indexing Server

Figure 2:
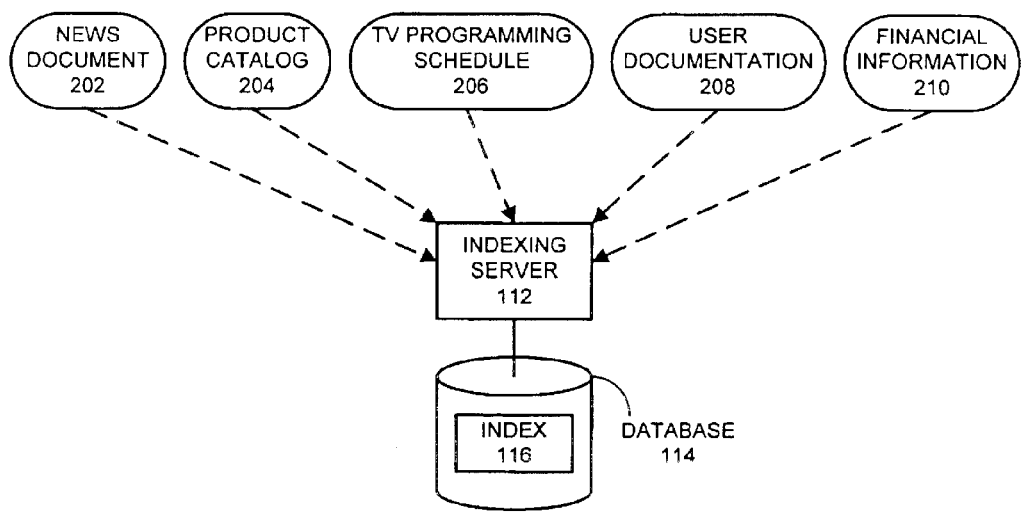
FIG. 2 illustrates how an indexing server creates an index for different document types in accordance with an embodiment of the present invention.

FIG. 2 illustrates how indexing server 112 creates an index for different document types in accordance with an embodiment of the present invention. In FIG. 2, indexing server 112 receives many different document types from different sources. Indexing server 112 integrates these different document types into index 116. Note that index 116 may include a single index containing many different document types. Alternatively, index 116 may contain a different index for each document type.

An unlimited number of document types can be indexed. For example, FIG. 2 illustrates a news document 202, a product catalog 204, a television programming schedule 206, a document containing user documentation 208 and a document containing financial information 210. Each of these different document types can have a different document structure, which can be defined in a language such as XML. Each of these different document structures can be associated with a different indexing scheme. In some documents, specific attributes should be included in the index. For example, for some types of user documentation it may be advantageous to index an attribute that indicates whether the user documentation is suitable for a novice user or an expert user.

Indexing Stylesheets and Tokenization Procedures

Figure 3:
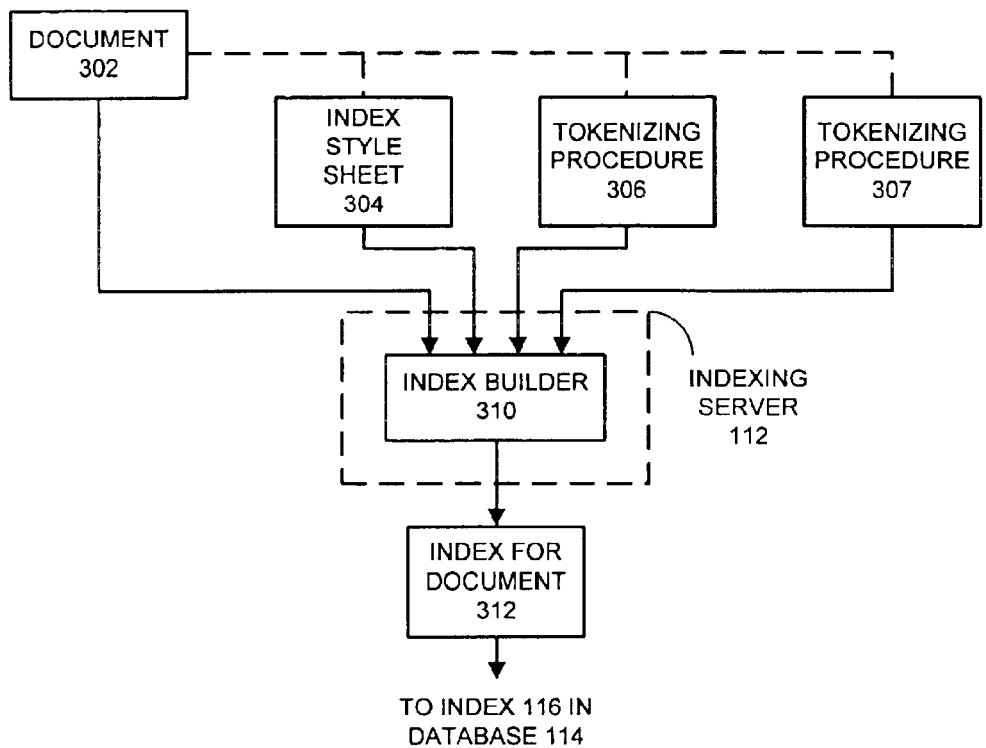
FIG. 3 illustrates how indexing stylesheets and tokenizing procedures are used to create and index for a document in accordance with an embodiment of the present invention.

FIG. 3 illustrates how stylesheets for indexing and procedures for tokenizing are used to create and index for a document in accordance with an embodiment of the present invention. In FIG. 3, an index building mechanism 310 within indexing server 112 takes as input a document 302 and produces an index 312 for the document 302. Index 312 feeds into a larger index 116 for a collection of documents, which is contained within database 114 (from FIG. 1).

During the index building process, index builder 310 refers to index stylesheet 304 and tokenizing procedures 306–307. Index stylesheet 304 contains a set of instructions for creating index 312 for document 302. For example, index stylesheet 304 can specify which sections of document 302 should be skipped in producing an index 312. Index stylesheet 304 can also specify attributes of document 302 to be included in index stylesheet 304. For example, an attribute can specify a minimum security-level for a person to have access to document 302. Another attribute can specify a content rating (G, PG-13, PG, R, X) for document 302.

Tokenizing procedures 306–307 specify how certain portions of document 302 are to be tokenized. For example, tokenizing procedure 306 may specify how a first portion of document 302 is to be tokenized, while tokenizing procedure 307 specifies how a second portion of document 302 is to be tokenized. Although most documents will likely use of a single tokenizing procedure, other documents may includes sections in different languages or from different domains, which require different tokenizing procedures.

Note that index stylesheet 304 is analogous to format stylesheets that are specified by the XML standard. Format stylesheets are used to specify display rd attributes, such as font and color, in order to display a XML document. Similarly, index stylesheet 304 specifies how an index for document 302 is to be created.

Note that although FIG. 3 illustrates indexing instructions and tokenizing instructions in the form of stylesheets and procedures, other representations are possible. For example, the indexing and tokenizing instructions can be contained within plug-in modules that can be plugged in to index builder 310.

These indexing and tokenizing instructions can also be referenced through an object defined within an object-oriented programming system. For example, an index parameter object can include a method that retrieves the instructions for building an index for document 302.

The tokenizing procedures 306–307 can additionally assume the form of code modules containing tokenization instructions, or may be provided by a remote service across a network.

Also note that index stylesheet 304 may contain references specifying where tokenizing procedures 306–307 can be retrieved from.

Note that index builder 310 includes standardized interfaces that are able to accept input from many different index stylesheets and tokenizing procedures. This allows index builder 310 to create indexes for many different document types using many different tokenization rules.

Tokenization Process

Figure 4:
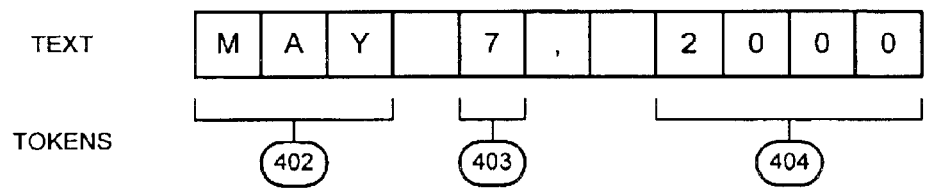
FIG. 4 illustrates an example of the tokenization process.

FIG. 4 illustrates an example of the tokenization process. In this example, a piece of text "MAY 7, 2000" is divided into three tokens 402–404. Token 402 contains the word "MAY." Token 403 contains the day number "7," and token 404 contains the year number "2000." Each of these tokens is associated with a unique token number, and the unique token numbers are used to create the index. Using token numbers leads to a more compact representation because token numbers take up less space than large character strings. Furthermore, during the searching process it is easier to lookup a number than a character string.

Process of Creating an Index

Figure 5:
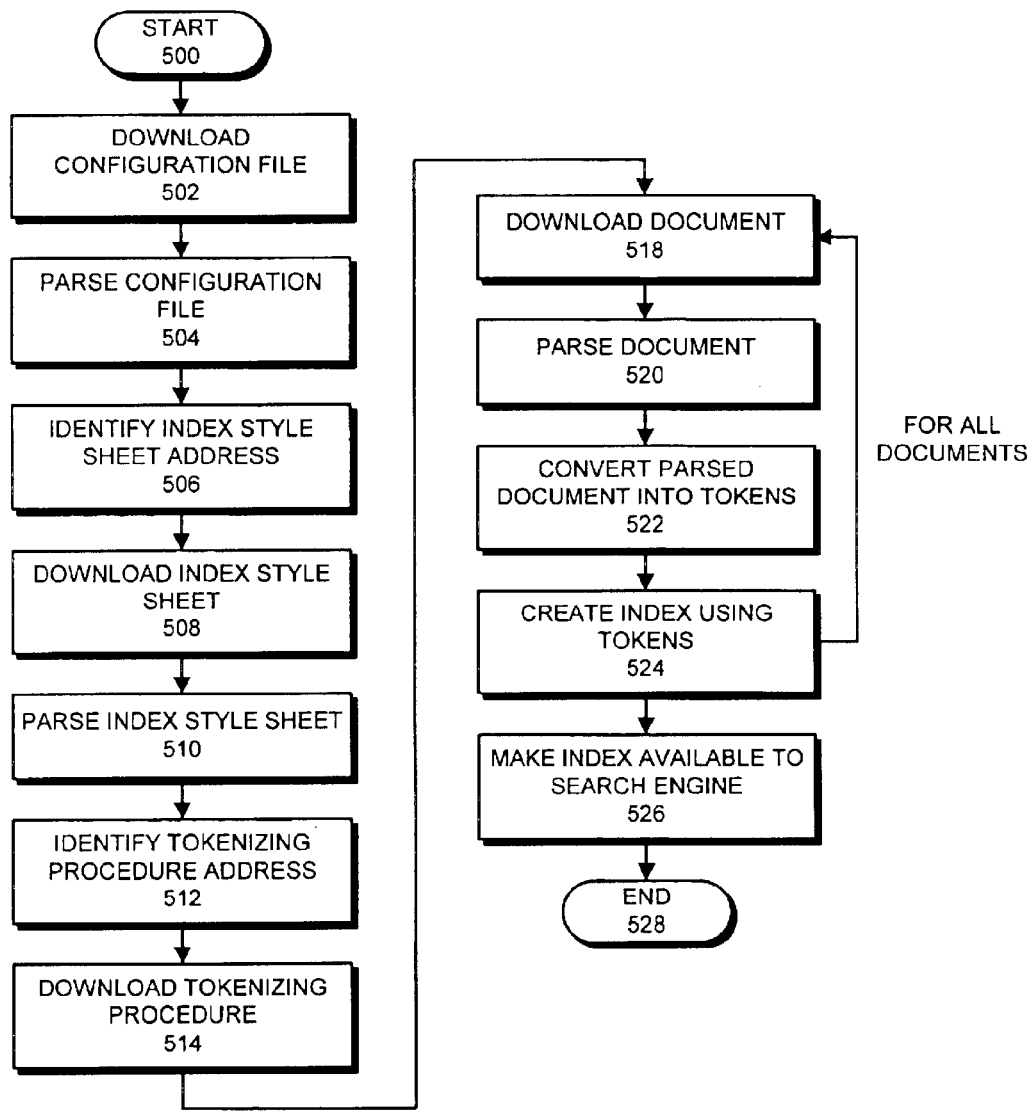
FIG. 5 is a flow chart illustrating the process of creating an index in accordance with an embodiment of the present invention.

FIG. 5 is a flow chart illustrating the process of creating an index in accordance with an embodiment of the present invention. The system starts by downloading a configuration file (step 502). This process may involve downloading a configuration file across a network. Next, the system parses the configuration file (step 504) and identifies an address of an index stylesheet 304 within the configuration file (step 506).

Next, the system downloads the index stylesheet 304 from the identified address (step 508). This may involve retrieving the stylesheet across a network from a location specified by a universal resource locator (URL). Alternatively, the stylesheet can be appended to the document, in which case, the index stylesheet can be easily retrieved.

Next, the system parses the index stylesheet 304 so that the instructions within the index stylesheet can be used during the index creation process (step 510).

The system similarly identifies an address of a tokenizing procedure 306 (step 512). (Note that the address of tokenizing procedure 306 may be contained within the configuration file, or alternatively, within index stylesheet 304). Next, the system downloads tokenizing procedure 306 from the identified address (step 514). In one embodiment of the present invention, tokenizing procedure 306 is retrieved from the same location as the index stylesheet 304. In another embodiment, tokenizing procedure 306 is retrieved from another location.

Next, the system inputs a number of documents into index 116. This is accomplished by downloading a document into index builder 310 (step 518) and then parsing the document using the instruction specified in index stylesheet 304 (step 520). The system converts the parsed document into tokens using tokenizing procedure 306 (step 522) and then creates an index using the tokens (step 524). This process is repeated for each document that is inputted into index 116.

After index 116 is complete, the system makes index 116 available to search engine 122 (from FIG. 1), so that search engine 122 can scan through index 116 to process queries (step 526).

Figure 6:
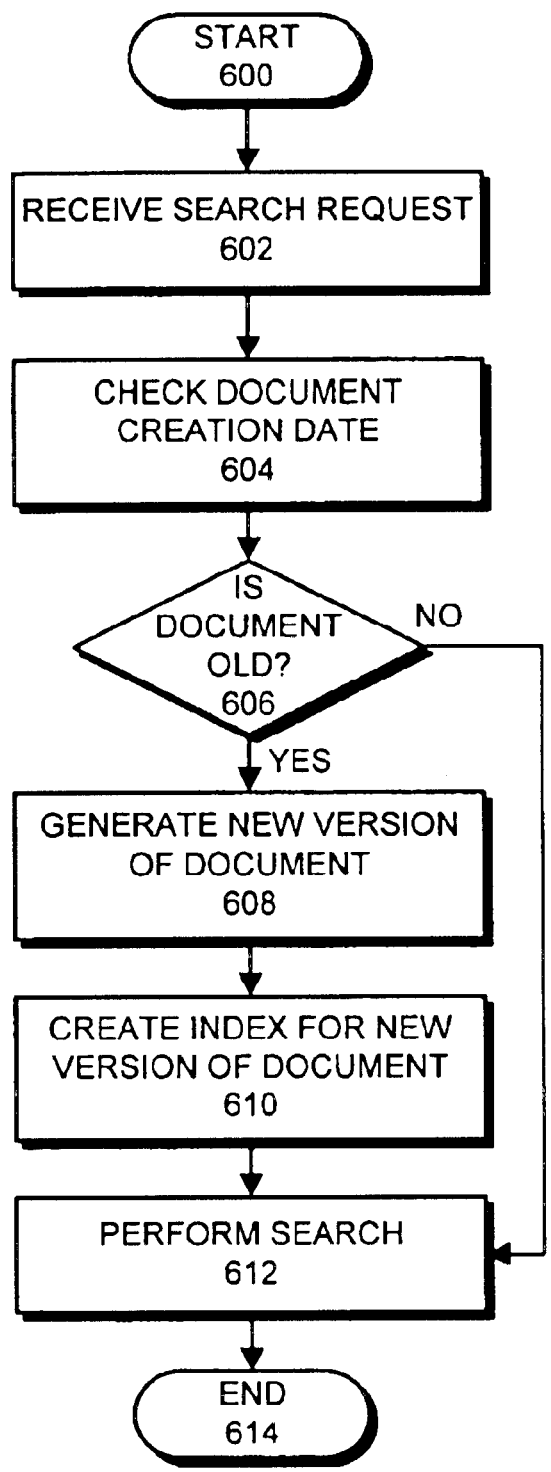
FIG. 6 is a flow chart illustrating the process of dynamically creating an updated index for an old document in accordance with an embodiment of the present invention.

FIG. 6 is a flow chart illustrating the process of dynamically creating an updated index for a document in accordance with an embodiment of the present invention. For certain types of searches data has a limited life. For example, in searching for current weather data, old weather data is of no interest.

In these circumstances, one embodiment of the present invention operates as follows. The system receives a search request (step 602). In response the search request, the system checks document creation dates for any documents that are involved in the search (step 604). If the system determines that a document is old (by perhaps comparing the age of the document against an age limit), the system causes a new version of the document to be generated (for example, by gathering new weather data) (step 606). Next, the system creates an index for the new version of the document (step 608). This process implicitly removes the index for the old version of the document (step 610). Finally, the system performs a search involving the newly updated index.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art.

For example, although the present invention is described in the context of a distributed computing system including clients and servers, the present invention is not necessarily limited to a distributed client-server computing system. In general, the present invention can apply to any system that generates an index for textual information or any system that tokenizes textual information.

Additionally, the above disclosure is not intended to limit the present invention. The scope of the present invention is defined by the appended claims.

What is claimed is:

1. A method for generating an index to facilitate searching through text within a document based upon an index stylesheet associated with the document, the method comprising:

receiving the document to be indexed;

parsing the document to produce a parsed document;

retrieving instructions for creating the index for the document from the index stylesheet associated with the document, wherein the index stylesheet specifies sections of the document to skip in creating the index for the document, wherein the index stylesheet specifies a plurality of tokenizing procedures, and wherein different tokenizing procedures are used to tokenize different portions of the document which require different tokenizing instructions, and creating the index for the document by transforming the parsed document in a manner that is specified by the instructions retrieved from the index stylesheet.

2. The method of claim 1, wherein retrieving the index stylesheet involves retrieving the index stylesheet across a network from a remote address.

3. The method of claim 1, wherein the index stylesheet is appended to the document.

4. The method of claim 1, further comprising making the index available to a search engine so that the search engine is able to scan through the index.

5. The method of claim 1, wherein the index stylesheet specifies attributes of the document that are to be included in the index.

6. The method of claim 1, further comprising receiving a plurality of additional documents to be indexed and creating indexes for the plurality of additional documents using the index stylesheet.

7. The method of claim 1, wherein creating the index for the document involves tokenizing the document by partitioning text within the document into individual meaning-carrying units of text.

8. The method of claim 1, further comprising prior to receiving the document, downloading and parsing an index configuration file, the index configuration file specifying the index stylesheet to be used in creating the index.

9. The method of claim 1, wherein receiving the document includes receiving the document from a client at an indexing server that creates the index for the client.

10. A computer-readable storage medium storing instructions that when executed by a computer cause the computer to perform a method for generating an index to facilitate searching through text within a document based upon an index stylesheet associated with the document, the method comprising:

receiving the document to be indexed, parsing the document to produce a parsed document;

retrieving instructions for creating the index for the document from the index stylesheet associated with the document, wherein the index stylesheet specifies sections of the document to skip in creating the index for the document, wherein the index stylesheet specifies a plurality of tokenizing procedures, and wherein different tokenizing procedures are used to tokenize different portions of the document which require different tokenizing instructions;

and creating the index for the document by transforming the parsed document in a manner that is specified by the instructions retrieved from the index stylesheet.

11. The computer-readable storage medium of claim 10, wherein retrieving the index stylesheet involves retrieving the index stylesheet across a network from a remote address.

12. The computer-readable storage medium of claim 10, wherein the index stylesheet is appended to the document.

13. The computer-readable storage medium of claim 10, wherein the method further comprises making the index available to a search engine so that the search engine is able to scan through the index.

14. The computer-readable storage medium of claim 10, wherein the index stylesheet specifies attributes of the document that are to be included in the index.

15. The computer-readable storage medium of claim 10, wherein the method further comprises receiving a plurality of additional documents to be indexed and creating indexes for the plurality of additional documents using the index stylesheet.

16. The computer-readable storage medium of claim 10, wherein creating the index for the document involves tokenizing the document by partitioning text within the document into individual meaning-carrying units of text.

17. The computer-readable storage medium of claim 10, wherein the method further comprises, prior to receiving the document, downloading and parsing an index configuration file, the index configuration file specifying the index stylesheet to be used in creating the index.

18. The computer-readable storage medium of claim 10, wherein the document is received from a client at an indexing server that creates the index for the client.

19. An apparatus for generating an index to facilitate searching through text within a document based upon an index stylesheet associated with the document, the apparatus comprising:

a receiving mechanism that is configured to receive the document to be indexed; a parser that is configured to parse the document to produce a parsed document;

a stylesheet retrieving mechanism that is configured to retrieve instructions for creating the index for the document from the index stylesheet associated with the document, wherein the index stylesheet specifies sections of the document to skip in creating the index for the document, wherein the index stylesheet specifies a plurality of tokenizing procedures, and wherein different tokenizing procedures are used to tokenize different portions of the document which require different tokenizing instructions;

and an index creation mechanism that is configured to create the index for the document by transforming the parsed document in a manner that is specified by the instructions retrieved from the index stylesheet.

20. The apparatus of claim 19, wherein the stylesheet retrieving mechanism is configured to retrieve the index stylesheet across a network from a remote address.

21. The apparatus of claim 19, wherein the index stylesheet is appended to the document.

22. The apparatus of claim 19, further comprising an access mechanism that is configured to make the index accessible to a search engine so that the search engine is able to scan through the index.

23. The apparatus of claim 19, wherein the index stylesheet specifies attributes of the document that are to be included in the index.

24. The apparatus of claim 19, wherein the receiving mechanism is configured to receive a plurality of additional documents to be indexed, and wherein the index creation mechanism is configured to creates index for the plurality of additional documents using the index stylesheet.

25. The apparatus of claim 19, wherein the index creation mechanism is configured to create the index for the document by partitioning text within the document into tokens containing individual meaning-carrying units of text.

26. The apparatus of claim 19, further comprising an index configuration mechanism that is configured to download and parse an index configuration file, the index configuration file specifying the index stylesheet to be used in creating the index.

27. The apparatus of claim 19, wherein the apparatus is contained with an indexing server that creates the index for a client.

* * * * *